(12) United States Patent
Shanny et al.

(10) Patent No.: US 8,922,315 B2
(45) Date of Patent: Dec. 30, 2014

(54) FLEXIBLE ULTRACAPACITOR CLOTH FOR FEEDING PORTABLE ELECTRONIC DEVICE

(75) Inventors: Ramy Shanny, Potomac, MD (US); Nikolay K. Yushin, Herndon, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 2 days.

(21) Appl. No.: 13/472,516

(22) Filed: May 16, 2012
(Under 37 CFR 1.47)

(65) Prior Publication Data
US 2012/0293292 A1  Nov. 22, 2012

Related U.S. Application Data

(60) Provisional application No. 61/486,790, filed on May 17, 2011.

(51) Int. Cl.
| | |
|---|---|
| *H01F 17/00* | (2006.01) |
| *H01F 21/02* | (2006.01) |
| *H01F 27/28* | (2006.01) |
| *H01G 11/36* | (2013.01) |
| *H01H 1/00* | (2006.01) |

(52) U.S. Cl.
CPC ............... *H01G 11/36* (2013.01); *Y02E 60/13* (2013.01); *H01H 1/0094* (2013.01)
USPC .......................... 336/105; 336/147; 336/180

(58) Field of Classification Search
USPC .......... 336/105, 147, 148, 180, 169; 333/105, 333/131, 34, 156; 29/25.42, 380; 324/339, 324/323, 335
See application file for complete search history.

(56) References Cited

U.S. PATENT DOCUMENTS

| | | | |
|---|---|---|---|
| 3,794,941 A | 2/1974 | Templin | |
| 3,939,422 A | 2/1976 | Deise | |
| 4,095,198 A | 6/1978 | Kirby | |
| 4,763,087 A | 8/1988 | Schrader | |
| 4,958,107 A * | 9/1990 | Mattas et al. | 315/289 |
| 5,436,601 A * | 7/1995 | Mandai et al. | 333/138 |
| 5,574,410 A | 11/1996 | Collins et al. | |
| 5,631,611 A | 5/1997 | Luu | |
| 5,650,726 A * | 7/1997 | Gasnier et al. | 324/339 |
| 5,859,533 A * | 1/1999 | Gasnier et al. | 324/339 |
| 6,211,749 B1 | 4/2001 | Yuzurihara et al. | |
| 6,556,096 B1 * | 4/2003 | Ouacha et al. | 333/23 |
| 6,714,095 B2 * | 3/2004 | Pavio et al. | 333/32 |

(Continued)

FOREIGN PATENT DOCUMENTS

EP        0570256 A1        11/1993

*Primary Examiner* — Mangtin Lian
(74) *Attorney, Agent, or Firm* — Daniel J. Long; Global IP Services, PLLC; Prakash Nama

(57) ABSTRACT

Disclosed is a flexible ultracapacitor having a flexible cloth including an autotransformer-type connected switch made with nanoporous carbon electrodes impregnated by an electrolyte. Each of the nanoporous carbon electrodes may be configured to have a circuit. The circuit may include a first inductor and a second inductor. Each of the first inductor and the second inductor may have a first terminal and a second terminal. The second terminal of the first inductor may be coupled to the first terminal of the second inductor. A switch may be coupled between the first terminal of the first inductor and the second terminal of the second inductor.

1 Claim, 8 Drawing Sheets

(56) References Cited

U.S. PATENT DOCUMENTS

| | | |
|---|---|---|
| 6,765,540 B2 | 7/2004 | Toncich |
| 7,675,383 B2 * | 3/2010 | Hangai et al. ................. 333/105 |
| 2003/0151482 A1 * | 8/2003 | Mayfield ....................... 336/180 |
| 2005/0237127 A1 | 10/2005 | Van Delden |
| 2006/0132274 A1 * | 6/2006 | Lee et al. ...................... 336/200 |
| 2007/0115086 A1 * | 5/2007 | Cairo Molins ................ 336/200 |
| 2011/0085284 A1 * | 4/2011 | Micallef ....................... 361/502 |

* cited by examiner

FLEXIBLE ULTRACAPACITOR CLOTH FOR FEEDING PORTABLE ELECTRONIC DEVICE

CROSS-REFERENCE TO RELATED APPLICATIONS

This Application claims rights under 35 USC §119(e) from U.S. Application Ser. No. 61/486,790 filed May 17, 2011, and the contents of which are incorporated herein by reference.

BACKGROUND OF THE INVENTION

1. Field of the Invention

The present invention relates to ultracapacitors and more specifically to flexible ultracapacitors.

2. Brief Description of Related Art

Typically, ultracapacitors are capable of accumulating of a high electric energy density. The ultracapacitors releases the accumulated electric energy density in a short span of time. Few existing types of ultracapacitors may be activated carbon ultracapacitors, nanotube ultracapacitors, polymeric supercapacitors, carbon foam and carbon fiber. The existing types of ultracapacitors may possess a low energy and a low power density which may lead to wide spread of a pore size in an electrode. The existing ultracapacitors also results in a low discharge rate and high charge storage capacity due to faradaic processes and electrochemical reactions.

SUMMARY OF THE INVENTION

The present invention discloses a flexible ultracapacitor having a flexible cloth including an autotransformer-type connected switch made with nanoporous carbon electrodes impregnated by an electrolyte. Each of the nanoporous carbon electrodes may be configured to have a circuit. The circuit may include a first inductor and a second inductor. Each of the first inductor and the second inductor has a first terminal and a second terminal. The second terminal of the first inductor may be coupled to the first terminal of the second inductor. A switch may be coupled between the first terminal of the first inductor and the second terminal of the second inductor. The switch may be a semiconductor open and shut control electrode switch.

According to one embodiment, the flexible cloth may be a wearable vest for an operator of a portable electronic device. A pore size and a shape of the nanoporous carbon electrodes in the flexible cloth may be pre-selected by modeling calculations. The pore size and the shape of the nanoporous carbon electrodes in the flexible cloth may be fabricated in a manner such that it provides high efficiency for passing electrolyte ions, thereby decreasing time response and serial equivalent resistance with simultaneous increasing power density.

According to another embodiment, design parameters of the nanoporous electrodes are selected from the group including an energy density requirement, a volume needed to support required peak power, average power consumption, a cloth size based on an area and a thickness of the nanoporous carbon electrodes.

According to another embodiment, the pre-selected modeling calculations for the pore size and the shape of the nanoporous carbon electrodes in the flexible cloth of the flexible ultracapacitor may have an energy density of 38 Joule per $cm^3$. For example, for the flexible ultracapacitor of volume 10 $cm^3$, the peak power may be up to 100 watt (W), the average power consumption may be 20 W for radio frequency (RF) devices, the cloth size may be 11.4×11.4 $cm^2$ area and the nanoporous carbon electrodes thickness may be 0.02 centimeter (cm).

Different types of circuits that may be configured in each of the nanoporous carbon electrodes are explained in further embodiments.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design.

The terms, "inductor", "winding", and "coil" are used interchangeably throughout the document.

The present invention discloses a flexible ultracapacitor having a flexible cloth (e.g., a flexible cloth 235 shown in FIG. 2A) including an autotransformer-type connected switch made with nanoporous carbon electrodes impregnated by an electrolyte. For example, the flexible cloth may be a wearable vest (e.g., a wearable vest 240 shown in FIG. 2B) of an operator of a portable electronic device. Each of the nanoporous carbon electrodes may be configured to have a circuit. The circuit may include a first inductor and a second inductor. Each of the first inductor and the second inductor has a first terminal and a second terminal. The second terminal of the first inductor may be coupled to the first terminal of the second inductor. A switch may be coupled between the first terminal of the first inductor and the second terminal of the second inductor.

According to one embodiment, discretely variable inductors may be used in radio-frequency (RF) matching circuits to provide maximum transfer power from a power amplifier to a load such as antenna, plasma etching chamber, industrial RF heating. The concept of using RF matching circuits may also be applicable for flexible capacitors.

The present invention discloses various circuits that may be configured in each of the nanoporous carbon electrodes.

Figure 1:
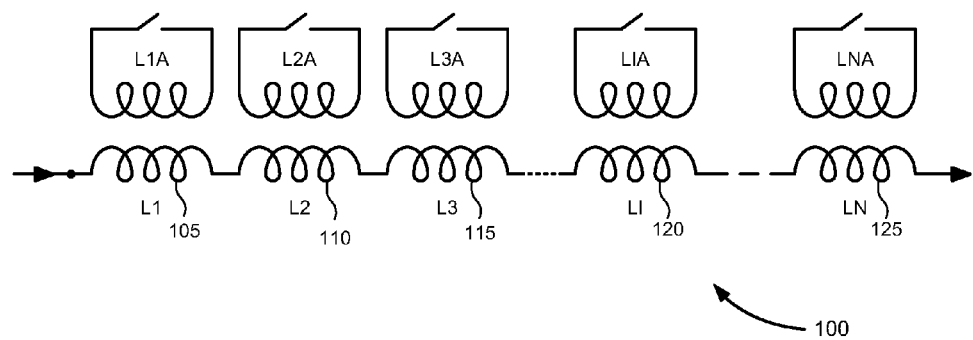
FIG. 1 illustrates a circuit of discretely variable switchable inductors, in the context of the present subject matter.

FIG. 1 illustrates a circuit 100 of discretely variable switchable inductors, in the context of the present subject matter. The circuit 100 may be a transformer type connected switch. The transformer type connected switches may be 105 denoted by $L_1$ and $L_{1a}$, 110 denoted by $L_2$ and $L_{2a}$, 115 denoted by $L_3$ and $L_{3a}$, 120 denoted by $L_i$ and $L_{ia}$ and 125 denoted by $L_n$ and $L_{na}$. The transformer type connected switches 105, 110, 115, 120 and 125 may be functionally identical circuits connected in series. Simple circuit analysis for single section (such as transformer type connected switch 120 denoted by $L_i$ and $L_{ia}$) of a two-winding transformer gives a ratio of resulting inductance $L_{max}$ before switching, (i.e. primary inductance) to $L_{min}$ resulting inductance after switching, which is given by an equation, $$1/(1-k_i^2) \quad (1),$$

where $k_i$ is a coupling coefficient between coils of the transformer type connected switch 120 denoted by $L_i$ and $L_{ia}$. The transformer type connected switch 120 may be coupled to a first coil $L_i$ and a second coil $L_{ia}$.

The resulting resistance after switching $R_{res}$ is given by, $$R_{res} = R_i + R_{ia} * k_i^2 * L_i / L_{ia} \quad (2),$$

where $R_i$ is a resistance of the first coil $L_i$ and $R_{ia}$ is a resistance of the second coil $L_{ia}$, coupled to the transformer type connected switch 120.

For a factor of two up in voltage and, consequently, factor of two down in current through switch, the resulting resistance may be given by, $$R_{ia} \approx 2 R_i \quad (3).$$

Figure 2A:
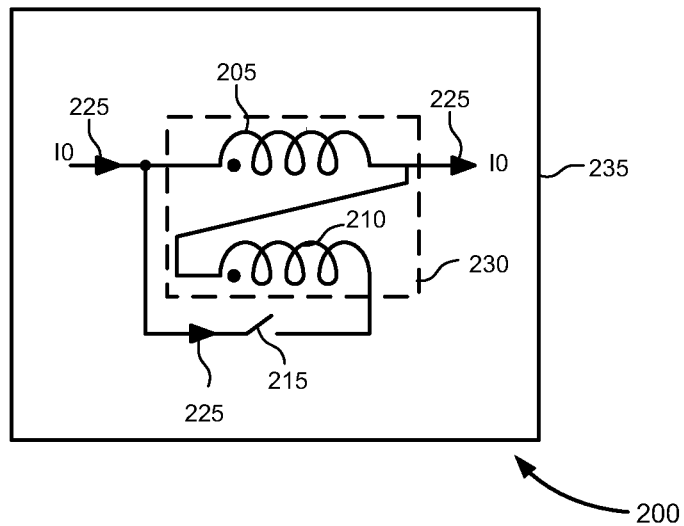
FIGS. 2A and 2B illustrate circuits that are configured in each of a nanoporous carbon electrodes, according to an embodiment of the present subject matter.
Figure 2B:
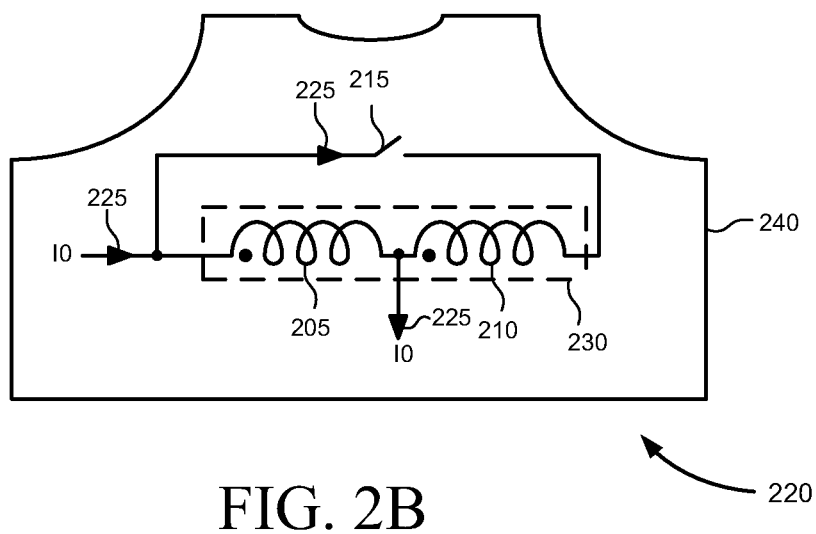

FIGS. 2A and 2B illustrate circuits, 200 and 220, respectively, that are configured in each of nanoporous carbon electrodes, according to embodiments of the present subject matter. The circuits 200 and 220 may be configured to include discretely variable inductors in which a switch is connected by a voltage down (current down) autotransformer 230.

The circuit 200 in FIG. 2A includes a first inductor 205, a second inductor 210 and a switch 215. The circuit 200 may be a circuit design of the circuit 220. Each of the first inductor 205 and the second inductor 210 has a first terminal and a second terminal. The second terminal of the first inductor 205 is coupled to the first terminal of the second inductor 210. The switch 215 is coupled between the first terminal of the first inductor 205 and the second terminal of the second inductor 210. The switch 215 may be a semiconductor open and shut control electrode switch. The direction of the current flow $I_0$ in the circuit 220 is shown by arrow 225. According to an embodiment, $L_{max}$ may be determined when the switch 215 is shut and $L_{min}$ may be determined when the switch 215 is open.

Simple circuit analysis for the circuit 220 gives the ratio of $L_{max}$ before switching, (i.e. primary inductance) to the resulting inductance $L_{min}$ after switching which is given by:

$$2/(1-k) \quad (4),$$

where k is the coupling coefficient between the first inductor and second inductor which provides transformation associated with the autotransformer. The coupling coefficient k may be the coupling coefficient between the first inductor 205, the second inductor 210 and a third inductor in case of a circuit having more than two inductors.

Resulting resistance after switching may be given by, $$R_{res} \approx R/2 \quad (5),$$

where $R_{res}$ is the resulting resistance and R is the resistance of first inductor.

Comparing equation (4) and (1) results in ratio given by, $$2*(1-k) \quad (6)$$

The ratio of the equation (6) is the ratio of $L_{max}$ to $L_{min}$. It may be observed that the ratio is 4 times more for the circuit 220 of FIG. 2B when compared to circuit 100 of FIG. 1.

On comparing the resulting resistances between equations (3) and (5) the resulting resistance after switching is about 2.5 times lower for the circuit 220 of FIG. 2B when compared to the circuit 100 of FIG. 1.

Figure 3A:
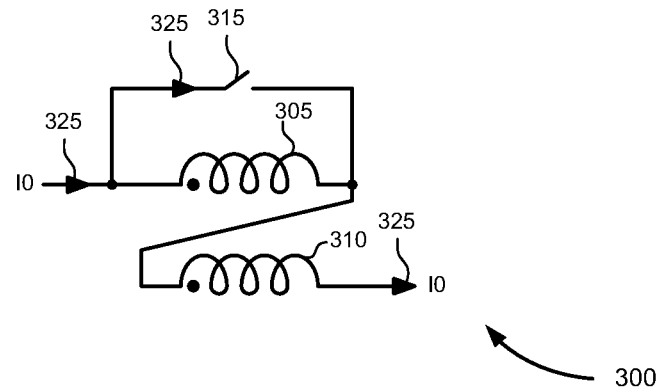
FIGS. 3A and 3B illustrate other circuits that are configured in each of the nanoporous carbon electrodes, according to an embodiment of the present subject matter.
Figure 3B:
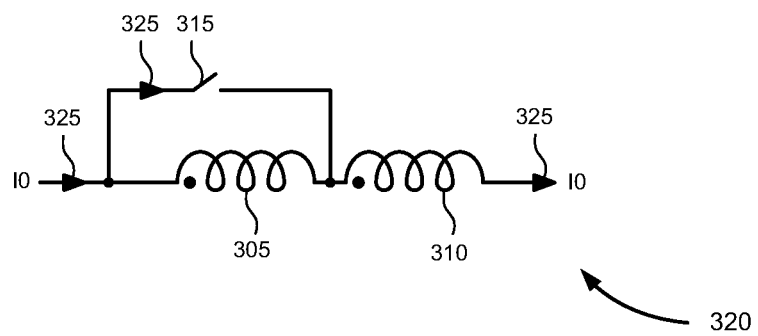

FIGS. 3A and 3B illustrate other circuits 300 and 320 that are configured in each of the nanoporous carbon electrodes, according to an embodiment of the present subject matter. The circuits 300 and 320 may be configured to include the discretely variable inductor in which the switch is connected by a voltage up (current up) autotransformer.

The circuit 300 shown in FIG. 3A includes a first inductor 305, a second inductor 310 and a switch 315. The circuit 300 may be a circuit design of the circuit 320. Each of the first inductor 305 and the second inductor 310 has a first terminal and a second terminal. The second terminal of the first inductor 305 is coupled to the first terminal of the second inductor 310. The switch 315 is coupled between the first terminal and the first terminal of the second inductor 310. The direction of the current flow $I_0$ in the circuit 320 is shown by arrow 325. The simple circuit analysis to the circuit 320 may be applied in a similar way as explained in FIGS. 2A and 2B. The simple circuit analysis may also be applicable to circuits explained in further embodiments.

Figure 4:
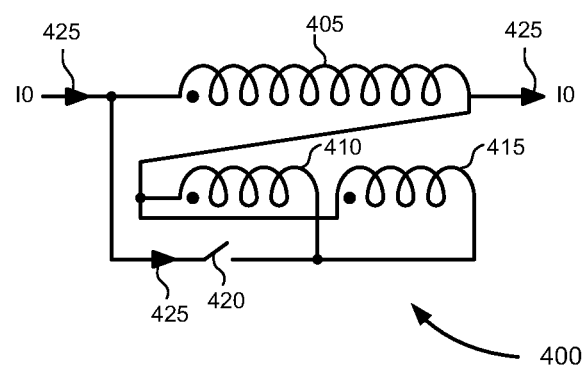
FIG. 4 illustrates yet another circuit that is configured in each of the nanoporous carbon electrodes, according to an embodiment of the present subject matter.

FIG. 4 illustrates yet another circuit 400 that is configured in each of the nanoporous carbon electrodes, according to an embodiment of the present subject matter. The circuit 400 may be configured to include discretely variable inductors in which the switch is connected by a voltage up (current down) autotransformer with two inductors.

The circuit 400 includes three a first inductor 405, second inductor 410, a third inductor 415 and a switch 420. The first inductor 405 is coupled to a second inductor 410 and a third inductor 415. Each of the first inductor 405, the second inductor 410 and the third inductor 420 has a first terminal and a second terminal. The second terminal of the first inductor 405 is coupled to the first terminals of the second inductor 410 and the third inductor 415. The switch 420 is coupled between the first terminal of the first inductor 405 and the second terminals of the second inductor 410 and the third inductor 415. The direction of the current flow $I_0$ in the circuit 400 is shown by arrow 425.

According to one embodiment, in case of two supplementary coils, the (resulting) coupling coefficient increases, assuming a fixed space between conductors of a main coil and the supplementary coils, which dictates at first by voltage between coils. According to FIG. 4, the main coil may be the first inductor 405 and the two supplementary coils may be the second inductor 410 and the third inductor 415.

Figure 5:
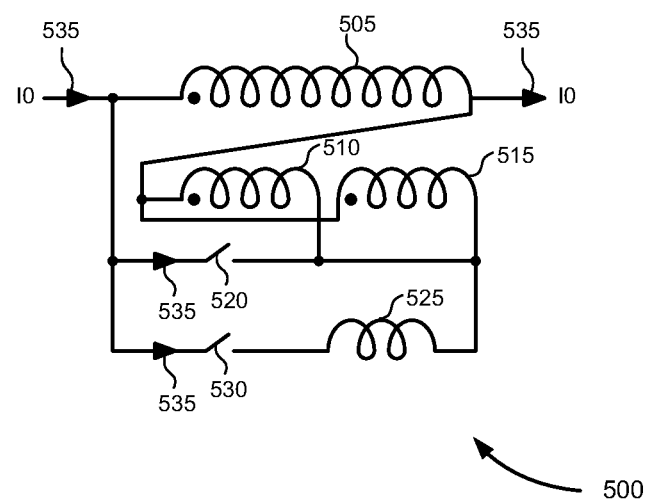
FIG. 5 illustrates yet another circuit that is configured in each of the nanoporous carbon electrodes, according to an embodiment of the present subject matter.

FIG. 5 illustrates yet another circuit 500 that is configured in each of the nanoporous carbon electrodes, according to an embodiment of the present subject matter. The circuit 500 may be configured to include the discretely variable inductor in which the switch is connected by the voltage up (current down) autotransformer by using two inductors and an additional switch connected with an additional inductor.

The circuit 500 includes a first inductor 505, a second inductor 510, a third inductor 515, a fourth inductor 525, a first switch 520 and a second switch 530. Each of the first inductor 505, the second inductor 510, the third inductor 515 and the fourth inductor 525 has a first terminal and a second terminal. The second terminal of the first inductor 505 is coupled to the first terminals of the second inductor 510 and the third inductor 515. The first switch 520 is coupled between the first terminal of the first inductor 505 and the second terminals of the second inductor 510 and the third inductor 515. Further, the second terminal of the fourth inductor 525 is coupled to the second terminals of the second inductor 510 and the third inductor 515. The second switch 530 is coupled between the first terminal of the first inductor 505 and the first terminal of the fourth inductor 525. The direction of the current flow $I_0$ in the circuit 500 is shown by arrow 535.

The circuit 500 includes the circuit 400 of FIG. 4 along with the second switch 530 and the fourth inductor 530. The circuit 400 of FIG. 4 provides high coupling. Due to presence of the second switch 530 and the fourth inductor 525, the circuit 500 provides precise tuning.

Figure 6:
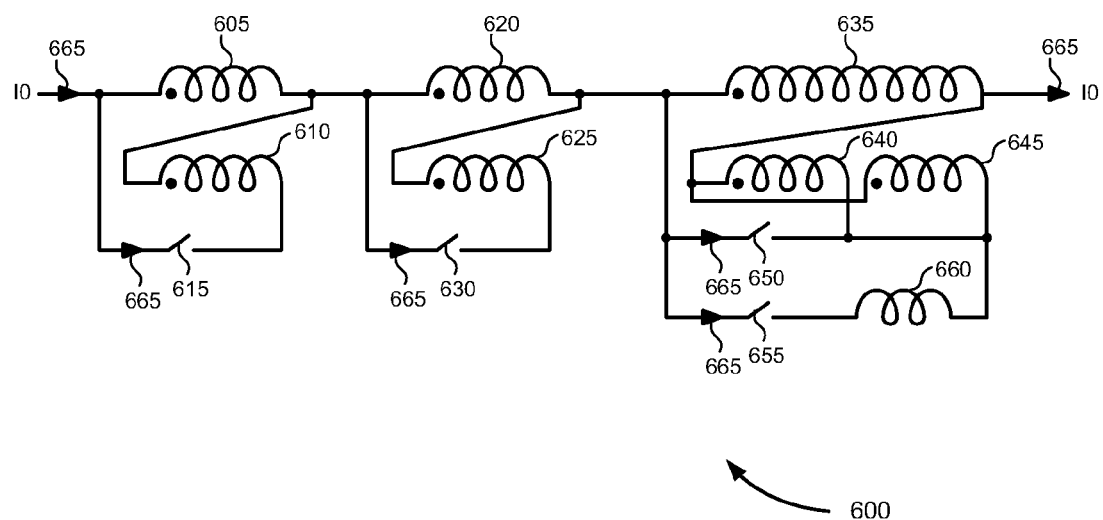
FIG. 6 illustrates yet another circuit that is configured in each of the nanoporous carbon electrodes in which the circuit of FIG. 2 and circuit of FIG. 5 are connected in series, according to an embodiment of the present subject matter.

FIG. 6 illustrates yet another circuit 600 that is configured in each of the nanoporous carbon electrodes in which the circuit of FIG. 2 and circuit of FIG. 5 are connected in series according to an embodiment of the present subject matter. The circuit 600 includes a first circuit, a second circuit and a third circuit. The first circuit includes a first inductor 605, a second inductor 610 and a first switch 615. Each of the first inductor 605 and the second inductor 610 has a first terminal and a second terminal. The second terminal of the first inductor 605 is coupled to the first terminal of the second inductor 610. The first switch 615 is coupled between the first terminal and the second terminal of the first inductor 605.

The second circuit is coupled to the first circuit in series. The second circuit includes a third inductor 620, a fourth inductor 625 and a second switch 630. Each of the third inductor 620 and the fourth inductor 625 has a first terminal and a second terminal. The second terminal of the third inductor 620 is coupled to the first terminal of the fourth inductor 625. The second switch 630 is coupled between the first terminal of the third inductor 620 and the second terminal of the fourth inductor 625.

The third circuit is coupled to the second circuit in series. The third circuit includes a fifth inductor 635, a sixth inductor 640, a seventh inductor 645, an eighth inductor 660, a third switch 650 and a fourth switch 655. Each of the fifth inductor 635, the sixth inductor 640, the seventh inductor 645 and the eighth inductor 660 has a first terminal and a second terminal. The second terminal of the fifth inductor 635 is coupled to the first terminals of the sixth inductor 640 and the seventh inductor 645. The third switch 650 is coupled between the first terminal of the fifth inductor 635, the second terminals of the sixth inductor 640 and the seventh inductor 645. The second terminal of the eighth inductor 660 is coupled to the second terminals of the sixth inductor 640 and the seventh inductor 645. The fourth switch 655 is coupled between the first terminal of the fifth inductor 635 and the eighth inductor 660. The direction of the current flow $I_0$ in the circuit 600 is shown by arrow 665.

According to one embodiment, the circuit 600 may be a variable inductance for broad range of tuning impedances at power 10 kW in a high frequency (HF) band.

Figure 7A:
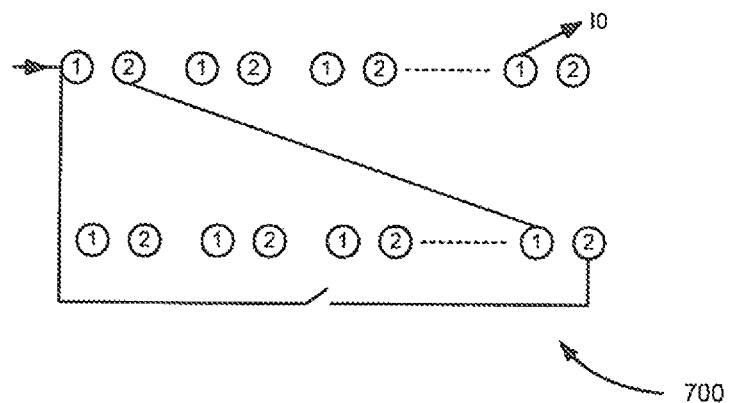
FIGS. 7A, 7B and 7C illustrate exemplary design of coupled inductors with reference to FIG. 2.
Figure 7B:
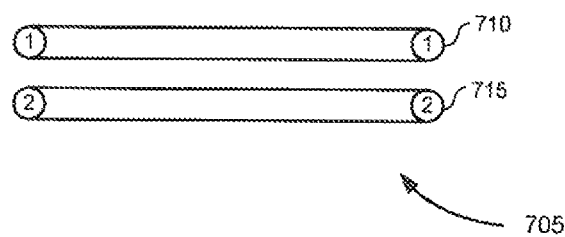
Figure 7C:
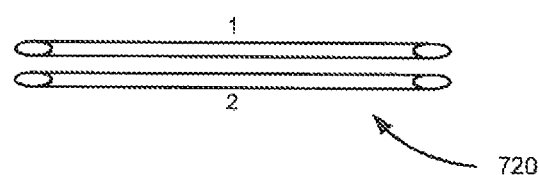

FIGS. 7A, 7B and 7C illustrate exemplary design of coupled inductors with reference to FIG. 2. At 700 of FIG. 7A, the inductors are coupled with alternating turns. Coupling in this manner provides tight coupling and may be considered and modeled as a coiled two-conductor transmission line. At 705 of FIG. 7B, conductors 710 and 715 represent a main coil and supplementary coils. The main coil may be the first inductor and the supplementary coils may be the second inductor and the third inductor. In FIG. 7C, 720 shows edge wound ribbon conductors. According to one embodiment, inter-coil capacitance may be larger that limits upper operating frequency.

Figure 8:
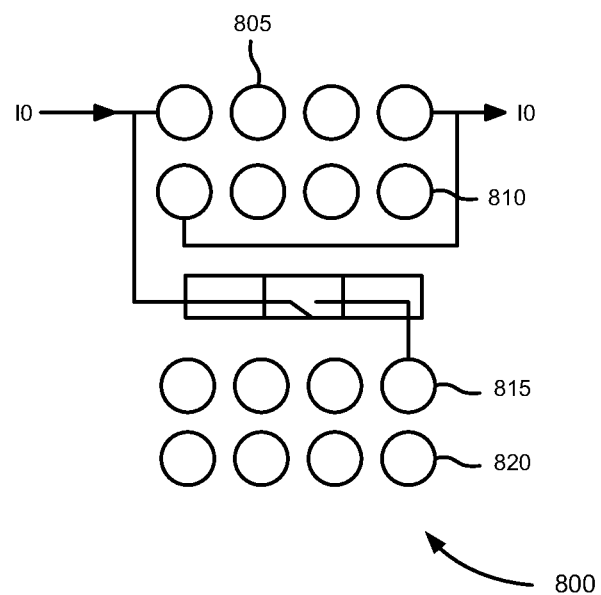
FIG. 8 illustrates an exemplary design of coupled inductors according to FIG. 2 in which two inductors are placed coaxially.

FIG. 8 illustrates an exemplary design of coupled inductors according to FIG. 2 in which two inductors are placed coaxially. At 800, the main coils 805 and 820 are coupled with supplementary coils 810 and 815. Number of turns in the main coil and the supplementary coil may not be equal. The main coil may be the first inductor and the supplementary coil may be the second inductor.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A flexible ultracapacitor, comprising:
a flexible cloth made with nanoporous carbon electrodes impregnated by an electrolyte, wherein the flexible cloth is a wearable vest of an operator of a portable electronic device, wherein a pore size and a shape of the nanoporous carbon electrodes in the flexible cloth are based on pre-selected modeling computations, wherein design parameters of the nanoporous carbon electrodes are selected from the group consisting of an energy density requirement, a volume needed to support required peak power, an average power consumption, a cloth size based on an area and a thickness of the nanoporous carbon electrodes, and wherein each of the nanoporous carbon electrodes are configured to have a circuit which comprises:
an autotransformer comprising:
a first inductor coupled to a second inductor, wherein the first inductor and the second inductor each having a first terminal and a second terminal, wherein the second terminal of the first inductor is directly coupled to the first terminal of the second inductor; and
a semiconductor-based open and shut control electrode switch directly coupled between the first terminal of the first inductor and the second terminal of the second inductor, wherein a ratio of resulting inductance and a resulting resistance after switching are given by the equations:

$L_{max}/L_{min}=2/(1-k)$, wherein k is a coupling coefficient between the first inductor and the second inductor, $L_{max}/L_{min}$ is the ratio of resulting inductance $L_{max}$ is inductance before switching and $L_{min}$ is the inductance after switching; and $R_{res} \approx R/2$, wherein $R_{res}$ is the resulting resistance and R is a resistance of the first inductor.

* * * * *